(12) United States Patent
Palmqvist et al.

(10) Patent No.: US 6,225,420 B1
(45) Date of Patent: May 1, 2001

(54) PROCATALYST AND PROCESS FOR THE PREPARATION OF A MULTIMODAL ETHYLENE POLYMER

(75) Inventors: Ulf Palmqvist; Solveig Johansson, both of Stenungsund; Lars Thorn, Kungälv, all of (SE); Peter Idelmann, Vantaa (FI); Anders Wahlström; Daniel Lindgren, both of Stenungsund (SE)

(73) Assignee: Boreallis A/S, Lyngby (DK)

( * ) Notice: Subject to any disclaimer, the term of this patent is extended or adjusted under 35 U.S.C. 154(b) by 0 days.

(21) Appl. No.: 09/093,765

(22) Filed: Jun. 9, 1998

Related U.S. Application Data

(63) Continuation of application No. PCT/SE96/01652, filed on Dec. 13, 1996, now abandoned.

(30) Foreign Application Priority Data

Dec. 19, 1995 (SE) .................................................. 9504539

(51) Int. Cl.$^7$ ........................................................ C08F 2/34
(52) U.S. Cl. ............................. 526/65; 526/66; 526/201; 526/901; 526/124.2; 526/124.5; 525/54; 525/240
(58) Field of Search ................................ 526/65, 66, 201; 525/54, 240

(56) References Cited

U.S. PATENT DOCUMENTS 4,048,412 * 9/1977 Caumartin et al. ..................... 526/65

FOREIGN PATENT DOCUMENTS

| 0 369 436 | 5/1990 | (EP) . |
| 0 503 791 | 9/1992 | (EP) . |
| 0 528 523 | 2/1993 | (EP) . |
| 0 533 452 | 3/1993 | (EP) . |
| WO 94/14856 | 7/1994 | (WO) . |
| WO 95/12622 | 5/1995 | (WO) . |

* cited by examiner

*Primary Examiner*—David W. Wu
*Assistant Examiner*—R. Rabago
(74) *Attorney, Agent, or Firm*—Merchant & Gould P.C.

(57) ABSTRACT

A procatalyst and a process for the preparation of a multimodal ethylene homopolymer or copolymer by gas-phase polymerisation is described. The procatalyst used in the process is prepared by:

a) contacting the support, preferably silica with a halogenating agent, preferably ethyl aluminium dichloride to obtain a first reaction product, b) contacting the first reaction product with a compound or mixture containing hydrocarbyl and one or more of hydrocarbyloxy, monoalkylamido, dialkylamido, carboxylato and alkoxymethoxy groups linked to magnesium, thereby to obtain a second reaction product (the procatalyst precursor), and c) contacting the second reaction product with a titanium compound, preferably $TiCl_4$. In step a) the molar ratio of the alkyl metal chloride to the surface hydroxyls of the inorganic oxide is preferably between 1:1 and 10:1. In step b) the atomic ratio of the magnesium to the chlorine of the alkyl metal chloride of step a) preferably is between 1:1.5 to 1:2.5. In step c) the atomic ratio of magnesium of step b) to titanium preferably is between 1.4 and 5.

22 Claims, No Drawings

US 6,225,420 B1

PROCATALYST AND PROCESS FOR THE PREPARATION OF A MULTIMODAL ETHYLENE POLYMER

This is a Continuation of International Application PCT/SE96/01652, with an international filing date of Dec. 13, 1996, now abandoned with regard to the United States of America.

BACKGROUND OF THE INVENTION

The present invention relates to a procatalyst, a procatalyst precursor, and a process for the preparation of a multimodal ethylene homopolymer and/or ethylene/1-olefin copolymer by gas-phase polymerisation. More particularly, the present invention relates to a procatalyst, a procatalyst precursor, and the preparation of a bimodal ethylene polymer by gas-phase polymerisation in two steps, wherein an ethylene polymer fraction with a low melt flow rate is preferably prepared in the first step, and an ethylene polymer fraction with a high melt flow rate is preferably prepared in the second step.

When talk is about the "modality" of a polymer, reference is made to the form of its molecular weight distribution curve, i.e. the appearance of the graph of the polymer weight fraction as function of its molecular weight. If the polymer is produced in a sequential step process, utilizing reactors coupled in series and using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima or at least be distinctly broadened in comparison with the curves for the individual fractions. Such a polymer product, produced in two or more serial steps, is called bimodal or multimodal depending on the number of steps. In the following all polymers thus produced in two or more sequential steps are called "multimodal". It is to be noted here that also the chemical compositions of the different fractions may be different. Thus one or more fractions may consist of an ethylene copolymer, while one or more others may consist of ethylene homopolymer.

The "melt flow rate", (MFR), of a polymer is determined according to ISO 1133 and is often (erroneously) referred to as the "melt index". The MFR, which is measured in g/10 min of polymer discharge under specified temperature, pressure and die conditions, is a measure of the viscosity of the polymer, which in turn for each polymer chemical type is mainly influenced by its molecular weight distribution, but also by its degree of branching etc. For a specific type of polymer the higher the value of its MFR, the lower is its mean molecular weight. When used herein, the expressions "low melt flow rate" or "low MFR" imply an $MFR_{2.16}$ (determined according to ISO 1133, condition 7) of about 0.001–10.0 g/10 min. Similarly, by the expression "high melt flow rate" or "high MFR" is implied an $MFR_{2.16}$ (determined according to ISO 1133, condition 4) of about 0.1–5000 g/10 min. These ranges overlap one another to a small extent, but it is to be understood that for a multimodal polymer produced in a two-step process, the polymer fraction produced in the "low MFR" step always has a lower MFR than the polymer fraction produced in the "high MFR" step.

By the term "halogen" represented by "X" in the formulas and used in this specification and claims, e.g. in the expressions "a halogen containing compound" or "a halogenating agent", is meant compounds containing a halogen selected from Cl, Br, I, F preferably from Cl or Br, and most preferably Cl.

It is known to prepare multimodal olefin polymers, preferably multimodal ethylene polymers, in two or more reactors connected in series. As examples of this prior art, EP 369 436 and EP 503 791 may be mentioned.

EP 369 436 relates to an optimised process for in situ blending of polymers, such as the preparation of a bimodal polyethylene polymer in order to provide polymers having desirable properties and an enhanced processability, in particular extrudability. In the process, a mixture of ethylene and at least one α-olefin having 3–10 carbon atoms is contacted, in at least two fluidised-bed reactors connected in series, with a catalyst comprising: a complex of magnesium, titanium, a halogen and an electron donor; at least one activator compound; and a hydrocarbyl aluminum cocatalyst. The complex may be prepared by using e.g. $MgCl_2$ as a magnesium compound, $TiCl_4$ as a titanium compound, and tetrahydrofuran as an electron donor. Examples of preferred activator compounds are triethylaluminium, triisobutylaluminium, and diethylaluminium chloride. Examples of preferred cocatalysts are triethylaluminium and triisobutylaluminium. The catalyst is preferably provided on a support, such as silica. In the process, a copolymer having a low melt index (measured according to ASTM D-1238, condition E) of about 0.001–1.0 g/10 min is prepared in the first reactor, and a copolymer having a high melt index of about 0.1–1000 g/10 min is prepared in the second reactor. The order of preparation may be reversed. In the reactor where the copolymer having a low melt index is prepared, hydrogen is optionally present in an amount of about 0.001–0.5 mole of hydrogen per mole of ethylene and α-olefin, while hydrogen is present in an amount of about 0.05–3.5 mole of hydrogen per mole of ethylene and α-olefin in the reactor where the high melt index copolymer is prepared. Cocatalyst is introduced into each reactor to restore the activity of the catalyst.

EP 503 791 relates to a process for producing bimodal ethylene polymers by gas-phase polymerisation using two gas-phase, fluidised-bed reactors connected in series. In the first reactor (step 1), an ethylene polymer of high molecular weight is produced, and in the other reactor (step 2), an ethylene polymer of low molecular weight is produced. The catalyst used for the polymerisation is a Ziegler-Natta catalyst of the same type as is used in EP 369 436, i.e. it comprises a complex of magnesium, titanium, halogen and an electron donor, together with a cocatalyst of hydrocarbyl aluminum, and the catalyst is preferably supported on a carrier, such as silica. In the polymerisation, the molar ratio of hydrogen to ethylene is controlled so as to be at least 8 times higher in the second reactor. According to EP 503 791, the problem is that the productivity in the second reactor is reduced, and this problem is, according to EP 503 791, solved by increasing the temperature in the second reactor; adding a cocatalyst to the second reactor; making the ethylene partial pressure in the second reactor at least 1.7 times higher than that in the first reactor; and preferably prolonging the residence time in the second reactor so that it is, for instance, twice as long as that in the first reactor.

The prior-art technique, as disclosed in EP 369 438 and EP 503 791, for the preparation of multimodal polyethylene by gas-phase polymerisation suffers from a number of drawbacks. Thus, procatalyst and cocatalyst have to be added, not only to the first reactor, but at least cocatalyst must normally be added also to the subsequent reactors to restore the activity of the catalyst. Further, the decreased activity of the catalyst after the first reactor is compensated for by increasing the ethylene partial pressure in the subsequent reactor(s). Yet another measure intended to compensate for the decreased activity of the catalyst is to prolong the residence time of the reaction mixture in the subsequent reactor(s). Finally, it is often necessary to use a different, larger reactor in the second step and any subsequent steps in order to prolong the residence time. These measures, which basically are necessitated by the poor balance of activity of the catalysts in the different reaction steps, and more specifically by their low activity in the presence of more substantial amounts of hydrogen, entail a more complicated control of the polymerisation parameters, higher production costs and higher investment costs. Accordingly, there is a need for a catalyst which has a good basic activity and furthermore retains a similar level of activity in each reaction step, also in the presence of hydrogen, i.e. shows a good activity balance.

BRIEF SUMMARY OF THE INVENTION

In connection with the present invention, it has now been discovered that the above-mentioned drawbacks of the prior art as regards the preparation of multimodal ethylene polymers by multi-step gas-phase polymerisation can be reduced or eliminated by carrying out the gas-phase polymerisation with the aid of a catalyst which has a good activity balance over a very wide range of hydrogen partial pressure, combined with a high overall activity throughout the polymerisation process.

The present invention thus provides a process for the preparation of a multimodal ethylene polymer by gas-phase polymerisation using a procatalyst comprising a support provided with a halogen containing compound, a magnesium compound and a titanium compound, in combination with a cocatalyst, characterised in that the procatalyst has been prepared by a process comprising the following steps:
a) contacting the support with a halogenating agent, thereby to obtain a first reaction product,
b) contacting the first reaction product with a magnesium compound or mixture containing hydrocarbyl and one or more of hydrocarbyloxy, monoalkylamido, dialkylamido, carboxylato or alkoxymethoxy groups, thereby to obtain a second reaction product, and
c) contacting the second reaction product with a titanium compound which contains chlorine and has the general formula

$$Cl_xTi(OR^{IV})_{4-x} \quad (2)$$

wherein $R^{IV}$ is a $C_2$–$C_{20}$ hydrocarbyl group and x is 3 or 4, thereby to obtain said procatalyst,
and that the gas-phase polymerisation comprises at least two steps of which
one step includes contacting a gaseous monomer composition, which comprises a major part of ethylene and hydrogen, with the procatalyst and the cocatalyst in a reactor under polymerisation conditions, thereby to produce a high melt flow rate polymer fraction, and
another step includes contacting a gaseous monomer composition, which includes a major part of ethylene and, optionally, 1-alkene comonomer and/or hydrogen, with the procatalyst and the cocatalyst in another reactor under polymerisation conditions, thereby to produce a low melt flow rate polymer fraction.

DETAILED DESCRIPTION OF THE INVENTION

In a preferred embodiment of the present invention the halogenating agent is an alkyl metal chloride of the general formula

$$(R_nMeCl_{3-n})_m \quad (1)$$

wherein R is a $C_1$–$C_{20}$ alkyl group, Me is a metal of group IIIa of the Periodic Table, n=1–2 and m=1–2.

In another preferred embodiment of the present invention, a bimodal ethylene polymer is prepared by gas-phase polymerisation in two steps.

In still another preferred embodiment, the step for producing the low melt flow rate polymer fraction precedes the step for producing the high melt flow rate polymer fraction.

The present invention also provides a procatalyst comprising a support provided with a halogen containing compound, a magnesium compound and a titanium compound, characterised in that the procatalyst has been prepared by a process comprising the following steps:
a) contacting the support with a halogenating agent, thereby to obtain a first reaction product,
b) contacting the first reaction product with a compound or mixture containing hydrocarbyl and or one or more of hydrocarbyloxy, monoalkylamido, dialkylamido, carboxylato and alkoxymethoxy groups linked to magnesium, thereby to obtain a second reaction product, and
c) contacting the second reaction product with a titanium compound which contains chlorine and has the general formula

$$Cl_xTi(OR^{IV})_{4-x} \quad (2)$$

wherein $R^{IV}$ is a $C_2$–$C_{20}$ hydrocarbyl group and x is 3 or 4, thereby to obtain said procatalyst,
and that, when depositing the procatalyst ingredients on the support in steps a)–c), at least step a) is carried out by contacting the support with a liquid containing the ingredient, the volume of the liquid not exceeding the pore volume of the support.

In a preferred embodiment of the present invention the halogenating agent is an alkyl metal chloride of the general formula

$$(R_nMeCl_{3-n})_m \quad (1)$$

wherein R is a $C_1$–$C_{20}$ alkyl group, Me is a metal of group IIIa of the Periodic Table, n=1–2 and m=1–2.

Further, the present invention provides a procatalyst precursor comprising a support provided with a halogen containing compound and characterised in that the halogen containing compound includes $MgX_2$ crystallites smaller than about 2 nm.

Still further, the present invention provides a process for the preparation of said procatalyst precursor, characterised in
a) contacting the support with a halogenating agent, thereby to obtain a first reaction product,
b) contacting the first reaction product with a compound or mixture containing hydrocarbyl and one or more of hydrocarbyloxy, monoalkydamido, dialkylamido, carboxylato and alkoxymethoxy groups linked to magnesium, thereby to obtain a second reaction product, and that at least step a) is carried out by contacting the support with a liquid containing the halogenating agent, the volume of the liquid not exceeding the pore volume of the support.

It should be noted that the process for the preparation of the procatalyst precursor corresponds to steps a) and b) of the process for the preparation of the procatalyst.

Further characteristic features and advantages of the present invention are evident from the subsequent specification and the appended claims.

As mentioned earlier, the present invention entails several important advantages in the production of ethylene polymers by multi-step gas-phase polymerisation, inter alia the following advantages:

It is not necessary to increase the ethylene partial pressure in the second polymerisation step to maintain the same productivity. On the contrary, the ethylene partial pressure may be substantially the same in the second polymerisation step as in the first polymerisation step, while maintaining the same productivity in both steps.

Also, it is not necessary to prolong the residence time of the polymerisation mixture in the second polymerisation step in order to maintain the productivity at the same level as in the first polymerisation step. Instead, the residence time may be the same or even shorter in the second step, while maintaining the same productivity in both steps.

Due to the fact that the catalyst of the present invention has a good activity balance over a wide range of hydrogen partial pressures, combined with a high overall activity throughout the polymerisation process, it is only necessary to add the procatalyst and the cocatalyst to the first polymerisation step. This is in contrast to prior-art multi-step gas-phase polymerisation processes, where at least additional cocatalyst and often also additional procatalyst are added in the second polymerisation step and in any further polymerisation steps.

The maintenance of a high catalyst activity further enables the use of polymerisation reactors of the same size in the different polymerisation steps. This is in contrast to the prior-art, where the reduced activity of the catalyst in the second polymerisation step and any subsequent polymerisation steps often in practice makes it necessary to use a larger polymerisation reactor, possibly also rated for higher pressures, in order to compensate.

A further advantage, particularly in connection with multi-step polymerisation in the so-called reversed mode, i.e. the low MFR polymer fraction is produced before the high MFR polymer fraction, is that no fines, or only a very small amount of fines, are produced at the polymerisation, neither in the first nor in the second reactor.

The good activity balance between the two reactors and the high overall activity shown by the catalyst of the present invention throughout the polymerisation process may be attributed to an important part to the catalyst composition. However, the properties of the catalyst are also to a great extent dependent on the mode of preparation of the catalyst and may be further improved by applying the so-called dry mixing technique in one or more steps of the preparation of the catalyst. For the purpose of the present invention, "dry mixing" refers to the impregnation of a porous solid body, such as a catalyst support, with a liquid, the volume of the liquid being smaller than or equal to the total pore volume of the porous body. In this way, the porous, solid body is kept as a dry, free-flowing substance during and after the impregnation, although it is impregnated with a liquid. Also, the dry-mixing technique facilitates an even distribution of the procatalyst components throughout the porous support, and in particular within the voids of the porous support, which is important considering that the internal surface of the porous support is much larger than its external surface.

The technique of dry-mixing is known per se in connection with metallocene catalysts, but has not been applied to the preparation of the type of catalyst used in the present invention.

Thus, WO 94/14856 relates to a process for forming carrier material, and more particularly to a process for preparing a supported metallocene catalyst comprising an aluminoxane and a metallocene compound. Dry-mixing is disclosed in connection with the impregnation of the support with the aluminoxane in order to avoid problems with fouling of the polymerisation reactor.

PCT application PCT/FI94/00499 relates to a supported metallocene catalyst and its preparation and use for producing olefin polymers. At the preparation of the catalyst, the support is impregnated with the aid of dry-mixing technique. To this end, the porous support is supplied with a solution containing the reaction product of a metallocene and an alumoxane, the volume of the solution not exceeding the pore volume of the support. In this way, a catalyst having a good morphology and a good activity is obtained. It is assumed that the properties of the catalyst are not only to be attributed to the dry-mixing technique, but that it is essential that first a reaction product of the metallocene and the alumoxane is produced, and then the solid support is impregnated with the reaction product together with a solvent, so that the pores of the support are barely filled.

The composition and the preparation of the catalyst used in the process of the present invention will now be described in more detail.

The catalyst of the present invention consists of essentially two components: (i) a procatalyst comprising a mixture of halogen, magnesium and titanium, supported on a particulate carrier; and (ii) a cocatalyst comprising a compound of a metal belonging to groups I–III of the Periodic Table.

More particularly, the procatalyst is prepared from a soluble halogenating agent, preferably a soluble chlorinating agent, a soluble magnesium compound or mixture (named hereafter a magnesium complex), which is a source of magnesium halide, and a titanium compound, which contains chlorine and will form the active sites. The solubility of the soluble compounds refers to solubility in a non-polar hydrocarbon, which is aliphatic or aromatic and has about 5–10 carbon atoms, such as pentane, heptane or toluene. The catalyst components are deposited on a suitable catalyst support. If a support material is used together with soluble catalyst components of sufficiently low viscosity, a good morphology, meaning that the particles are of similar size and will not give rise to any substantial amount of fines, can be achieved for the catalyst and thereby for the polymer. The procatalyst is prepared by a process comprising the following steps:

a) contacting the support with an halogenating agent, thereby to obtain a first reaction product, b) contacting the first reaction product with a compound or mixture containing hydrocarbyl and one or more of hydrokarbyloxy, monoalkylamido, dialkylamido, carboxylato and alkoxymethoxy groups linked to magnesium, thereby to obtain a second reaction product, c) contacting the second reaction product with a titanium compound which contains chlorine and has the general formula $$Cl_xTi(OR^{IV})_{4-x} \qquad (2)$$

wherein $R^{IV}$ is a $C_2$–$C_{20}$ hydrocarbyl group and x is 3 or 4, thereby to obtain said procatalyst.

The support material must have a suitable particle size distribution, a high porosity and a large specific surface area. The average particle size should be about 10–250 μm, preferably about 30–100 μm. The specific surface area should be at least about 3 m²/g, preferably at least 50 m²/g, and more preferably about 100–500 m²/g. The mean pore size should lie between 10 and 100 nm and most preferred be at least 20 nm. The pore volume should be about 0.9–3.5 ml/g. The support material may be chemically pretreated, e.g. by silanation or treatment with aluminium alkyls, etc.

Such pretreated support material also includes a support material pretreated to exhibit coarse $MgX_2$, such as $MgCl_2$ crystallites detectable by X-ray diffraction analysis (i.e. the crystallites are larger than about 2.5 nm). The pretreated support material is subsequently treated in accordance with the present invention with a halogenating agent, a magnesium complex, and a titanium compound to provide the procatalyst according to the invention. Use of this pretreated silica carrier gives a catalyst, which gives especially low amounts of gel particles, but which also is less flexible, in so far as its activity is only satisfactory when polymerizing in "reversed mode", i.e. with the high molecular weight, copolymer component produced in the first reactor (see Eaxmple 3). Any support material having the above described characteristics, including organic support materials, such as polyethylenes, polypropylenes, polyvinyl chlorides, polystyrenes, poly(acrylonitrile-butadiene-styrene), polymethylmethacrylates, and polycarbonates, and metal oxides, preferably silicon, aluminium, titanium, chromium and zirconium oxides or mixtures thereof, are suitable as support material. Silicon dioxide or silica is most preferred.

Preferably, the support material is dried before being impregnated with the catalyst components. A good result is achieved if the support is heat-treated at 100–900° C. for a sufficient time, so that the surface hydroxyl groups, in the case of silica, are reduced to below 2 mmol/g $SiO_2$.

The halogenating agent, which, after being anchored chemically or by physical adsorption onto the support, mainly acts as a halogenating agent, may be selected among known halogenating agents, preferably chlorinating agents, such as aluminiumtrichloride, antimony pentachloride, sulphuryl chloride, thionyl chloride, carbontetrachloride, chloramines, and, preferably, alkyl metal chlorides. The alkyl metal chloride is preferably a chlorine-containing aluminium compound that is soluble in non-polar hydrocarbon solvents as defined above. The alkyl group R of the alkyl metal chloride may be linear, branched or cyclic, or mixtures thereof, and is preferably $C_2$–$C_{20}$ alkyl. A combination of different halogenating agents may also be used. More preferably, the alkyl aluminium chloride is a lower alkyl aluminium dichloride, and most preferably is ethyl aluminium dichloride (EADC).

The halogenating agent which below is exemplified by alkyl metal chloride should be deposited on the support material as the first component in the procatalyst synthesis. The main purposes of the alkyl metal chloride is i) to react with the surface hydroxyl groups and thereby destroy their deactivating influence on the catalyst and ii) to be anchored as a chlorinating agent onto the surface of the carrier, an agent which can in a subsequent step react with the magnesium complex then added, forming surface bonded, active, magnesium dichloride. In view of (i), it is important that all the surface hydroxyl groups are reacted with the alkyl metal chloride, and the molar ratio of the alkyl metal chloride to the hydroxyl groups should therefore be at least 1:1. The number of hydroxyl groups on the surface of the inorganic support, such as silica, depends on the deactivation pre-treatment, if any, of the support. If the support has been deactivated by heat treatment at a high temperature of about 600° C. the support will have about 0.6 mmole OH groups/g, while it will have about 1.7 mmole OH/g if it has been deactivated at a lower temperature of about 200° C. In addition to the alkyl metal chloride needed to react with the surface hydroxyl groups on the support, alkyl metal chloride may also be physically adsorbed onto the surface of the support. Such non-reacted adsorbed alkyl metal chloride may be used as a further chlorine source for subsequent reaction with the above mentioned magnesium complex to provide catalytically active magnesium halide on the surface of the support. This is a reason for adding the alkyl metal chloride in a molar excess to the surface hydroxyl groups on the support. On the other hand, however, excess alkyl metal chloride which is not adsorbed on the surface of the support should be avoided, since such non-adsorbed excess alkyl metal chloride has been found to increase the formation of undesired "fines" when the catalyst is used for the polymerisation of olefins. The excess amount of alkyl metal chloride possible to adsorb on the surface of the support is of the same order of magnitude as a monomolecular layer of the alkyl metal chloride on the surface of the support would amount to. Both the amount of alkyl metal chloride needed to react with the surface hydroxyl groups and the amount possible to adsorb on the surface of the support may be determined by routine experiments known to the man skilled in the art.

For the above reasons, the molar ratio of the added alkyl metal chloride to the surface hydroxyl groups of the support should lie in the range of from about 1:1 to about 10:1, preferably from about 1:1 to about 1.5:1. An even deposition is achieved if the viscosity of the component or its solution is below 10 mPa.s at the temperature applied. To achieve this low viscosity, the alkyl metal chloride agent may be diluted by a non-polar hydrocarbon. A good choice is to use a 5–25% hydrocarbon solution of ethyl aluminium dichloride. The deposition of the agent can be carried out within a wide range of temperatures, preferably between 0° C. and 110° C. The addition times and the addition techniques have to be adjusted to give an even distribution of the component in the support material.

When the support has been treated with the alkyl metal chloride (preferably EADC), part of the latter has been bonded onto the surface of the support as —O—$AlCl_2$ groups, while the rest has been physically adsorbed onto the surface of the support. The product thus formed will in the following be called "precursor A".

It is particularly preferred to deposit the alkyl metal cloride component with the aid of the above-mentioned dry-mixing technique. To this end, the porous support is contacted with a volume of alkyl metal chloride solution that does not exceed the pore volume of the support. In order to penetrate the voids of the support satisfactorily, the alkyl metal chloride solution should further have a viscosity below 10 mPa.s at the temperature of contact between the solution and the support. Depending on the amount of alkyl metal chloride to be deposited, as well as the concentration of the alkyl metal chloride solution, the support may be contacted one or several times with the liquid, care being taken that, at each such contact, the volume of the liquid does not exceed the pore volume of the support. Also, the liquid is removed after each contact, e.g. by evaporation in vacuum and/or at elevated temperature, so that the voids of the support are then ready to receive another volume of liquid.

The magnesium complex used in the catalyst synthesis should be soluble in a non-polar hydrocarbon such as defined before. The Mg-complex should satisfy the general formula $$Mg_a(AR')_bR''_cX_d \qquad (3)$$

wherein X is halogen, preferably chlorine, A is O or NR''' where R''' is H or a $Cl_1$–$C_{20}$ hydrocarbyl group and R' is a hydrocarbyl group, preferably a $C_2$–$C_{20}$ hydrocarbyl group, that may or may not contain a hetero element, and R'' is a $C_2$–$C_{20}$ hydrocarbyl group, and wherein $a \geq 1$, $b > 0$, $c > 0$ and $d \geq 0$, $a = \frac{1}{2}(b+c+d)$ and the molar ratio $c/b < 1$; preferably $c/b$ is 0.01–0.21.

Preferred Mg complexes are represented by complexes of the formulas (4), (5) or (6), or a mixture thereof:

$$Mg(AR')_p(R'')_{2-p} \quad (4)$$

$$Mg(OCOR')_p(R'')_{2-p} \quad (5)$$

$$Mg(O-CH_2-OR')_p(R'')_{2-p} \quad (6)$$

In formulas (4), (5) and (6), R' and R'' may be the same or different $C_2$–$C_{20}$ hydrocarbon groups, preferably having at least 5 carbon atoms, most preferably 6–10 carbon atoms. Preferably, R' is a linear or branched aliphatic or aromatic $C_2$–$C_{20}$ group, and R'' is a $C_2$–$C_{20}$ alkyl group. The value of p is $1.5 < p < 2$, preferably $1.65 < p < 1.98$ and most preferably $1.75 < p < 1.90$. OCO is a carboxy group in an carboxylic acid. In formula (4) A may be O or NR'''. It is essential to the optimal composition that p be less than 2.

The compounds (3)–(6) are defined herein as the magnesium complexes. A requirement is that, in all the compounds (3)–(6), there is a small amount of magnesium alkyl groups. One way to produce these magnesium complexes is to react a soluble magnesium alkyl with an alcohol. To have a good balance of hydrogen response and polymerisation activity, the $MgR_2$/ROH reactant ratio must be larger than 1:2 and smaller than 1:1.5, preferably between 1:1.98 and 1:1.65, and most preferably between 1:1.90 and 1:1.75. This ratio does not have to be created immediately when the magnesium complex is prepared, but may be created later on, for example after impregnation of the precursor A with the magnesium compound by the addition of a sufficient amount of $MgR_2$ to reach the correct $MgR_2$/ROH reactant ratio. The relation between the reactant ratio and the complex composition can be obtained from the stoichiometry of the following reaction $$MgR''_2 + pR'OH \rightarrow Mg(OR')_p R''_{2-p} + pR''H$$

wherein p is the number of R'OH moles per one mole of $MgR''_2$.

The magnesium complex may be the reaction product of a di-$C_2$-$C_{30}$-alkyl magnesium, preferentially dibutyl magnesium, butyl ethyl magnesium or butyl octyl magnesium and an alcohol having at least 5 carbon atoms. The magnesium complex preferentially is the reaction product of a dialkyl magnesium and a branched alcohol having at least 5 carbon atoms, representative examples of which are 2-metyl-1-pentanol, 2-ethyl-1-pentanol, 2-propyl-1-pentanol, 2-methyl-1-hexanol and 2-ethyl-1-hexanol. The latter alcohol is currently most preferred.

The most easily available Mg compounds, such as the Mg halides, particularly $MgCl_2$, do not dissolve in liquid non-polar hydrocarbons, but only in polar solvents. Magnesium alcoholates may be prepared with the aid of lower aliphatic alcohols, such as methanol or ethanol. However, such Mg alcoholates are not miscible with hydrocarbon solvents. Mg alcoholate precipitated directly on the carrier, for instance on silica, will give no polymerisation activity. On the other hand, a branched alcohol, for example 2-ethyl-1-hexanol or 2-propyl-1-pentanol, which has a steric hindrance in the molecule close to the Mg—O bond in the Mg-alcoholate, does not aggregate equally easily forming insoluble compounds. With a branched alcohol, a Mg alcoholate solution is thus formed which is completely miscible with liquid hydrocarbons. This kind of hydrocarbon solution is suitable for the impregnation of precursor A particles, so that Mg atoms are distributed as evenly as possible on the precursor A particles and also can penetrate optimally into the particle when the hydrocarbon is evaporated.

A Mg alcoholate may thus be prepared from a branched aliphatic monoalcohol and a Mg dialkyl. The alcohol has a sterically bulky hydrocarbon group which prevents it from coordinating tightly. In the Mg dialkyl, the alkyl group has 2–10 carbon atoms and may be linear or branched. Suitable examples are dibutyl-Mg (DBM), butyl ethyl-Mg (BEM), butyl octyl-Mg (BOMAG). When the Mg alcoholate is prepared, the solution of monoalcohol and Mg dialkyl has a very high viscosity near the stoichiometric equivalent point, and it is difficult to carry out the reaction. The viscosity of the solution may be decreased by adding Ti tetraalkoxide, preferably Ti tetrabutoxide, to the solution. It is possible also to start with preformed magnesium dialcoholate, dissolve it in the hydrocarbon solvent and then add the requisite amount of dialkyl magnesium in order to reach the molar ratio alkyl/alkoxide groups desired. The magnesium dialcoholate may be prepared in different ways, e.g. by reaction between metallic Mg and a suitable alcohol or by a Grignard-type reaction between an alkyl magnesium compound and an aldehyde, ketone or ester.

When the precursor A particles are impregnated with the magnesium complex described above, which preferably is in the form of a Mg-alcoholate solution containing a little Mg dialkyl (1–20 mol-%, preferably about 10 mol-%), the magnesium complex reacts with the —Al—$X_2$ groups on the surface of the precursor A particles to convert them to —Al—(OR)R groups and precipitate $MgX_2$ on the surface of the precursor A particles. This precipitated $MgX_2$ is very evenly distributed on the external, and more importantly on the internal, surface of the porous particles, at this stage called precursor B particles.

The precursor B particles thus obtained constitute a procatalyst precursor which forms a particular aspect of the present invention.

A characterising feature of the procatalyst precursor prepared according to the present invention is that the size of the $MgX_2$ crystallites is so small as to be non-detectable by X-ray diffraction analysis. This means that the $MgX_2$ crystallites are smaller than about 2 nm (20 Å). Together with a Ti halide, such as $TiCl_4$, this $MgX_2$ forms catalytically active sites for the polymerisation of olefins.

A good deposition of the magnesium complex solution is achieved if the volume of the magnesium complex is about two times the pore volume of the support material. This is achieved if the concentration of the complex in a hydrocarbon solvent is 5–60% with respect to the hydrocarbon solvent used. The ratio of magnesium to chlorine in the alkyl metal chloride agent should be from 1:1.0 to 1:4. A good result is achieved if this ratio is from 1:1.5 to 1:2.5.

When depositing the magnesium complex on the precursor A, it should have a viscosity that is lower than 10 mPa.s at the temperature used. The viscosity of the magnesium complex solution may be adjusted, for example by the choice of the group R' in the formulas (3)–(6), branched alkyl groups giving a lower viscosity than linear alkyl groups; by the choice of the concentration of the hydrocarbon solution; by the choice of the ratio of the magnesium alkyl to the alcohol; or by using a viscosity-reducing agent, such as toluene or methylene chloride.

Alternatively, the magnesium complex may be deposited on the precursor A with the aid of the dry-mixing technique described above for the alkyl metal chloride component.

The dry-mixing technique is particularly useful when it is desired to obtain precursor B (the procatalyst precursor) as a separate product, e.g. when the subsequent treatment with a titanium compound is to be carried out at a different place or at a later point of time. Alternatively, if the dry-mixing technique is not used precursor B may be dried in order to give the procatalyst precursor as a separate product.

The titanium compound can be a chlorinated alcoholate, such as $TiCl_3OR$, or a purely chloride-containing compound, such as $TiCl_4$. The general composition of the titanium compound corresponds to the following formula

$$Cl_xTi(OR^{(IV)})_{4-x} \qquad (2)$$

In formula (2), $R^{IV}$ is a $C_2-C_{20}$ hydrocarbyl group, and x is 3 or 4, preferably 4. The Ti compound should be totally soluble in a non-polar hydrocarbon at the temperature applied.

The titanium compound can be added to the precursor B with or, usually without previous drying of the catalyst to remove the volatile hydrocarbons. The molar amount of $TiCl_4$ or a corresponding titanium compound should be added to the reaction mixture in a Mg/Ti ratio that is greater than 1 and less than 10, preferably between 1.4 and 5, and most preferred between 1.5 and 3, such as about 2. The components should be allowed to react with each other for a sufficient amount of time at a suitable temperature. Any remaining hydrocarbons can, if desired, be removed by using a slight vacuum, elevated temperature or nitrogen purging.

When the precursor B is treated with the tetra-valent Ti halide (titanised), a small amount of the alkoxy and alkyl groups in the Al groups bonded to the support is converted to halogen groups and a small amount of Ti halide is reduced to the tri-valent form.

The titanium compound may be deposited on the precursor B with the aid of the dry-mixing technique described earlier.

As is evident from the above disclosure, the dry-mixing technique may be used for depositing all the procatalyst components on the porous support. To optimise the results, however, the most important thing is that the alkyl metal chloride component is deposited by the dry-mixing technique, while some excess liquid (i.e. liquid in excess of the pore volume of the support) may be present when the magnesium complex and the titanium component are deposited.

In addition to the procatalyst described above, the catalyst composition used in the process of the present invention includes a cocatalyst. Such cocatalysts are known to the man skilled in the art and comprise an organometallic compound containing a metal of groups I–III of the Periodic Table bonded to a carbon atom, for example organic alkali metal compounds, organic alkaline earth metal compounds, and organo aluminium compounds. Specific examples include alkyl lithiums, aryl sodiums, alkyl magnesiums, aryl magnesiums, alkyl magnesium halides, aryl magnesium halides, alkyl magnesium hydrides, trialkyl aluminiums, dialkyl aluminium monohalides, alkyl aluminium sesquihalides, alkyl aluminium dihalides, alkyl aluminium hydrides, alkyl aluminium alkoxides, alkyl lithium aluminiums, and mixtures thereof. Trialkyl aluminiums and dialkyl aluminium monohalides are preferred, e.g. triethylaluminium, triisobutylaluminium, and diethylaluminium chloride.

The procatalyst according to the present invention may be used together with a cocatalyst to polymerise ethylene, alone or together with 1-olefin comonomers to give ethylene homopolymers and copolymers. Examples of polymerisation processes where the procatalyst may be used are gas-phase polymerisation, solution polymerisation, slurry polymerisation, and bulk polymerisation. It is particularly preferred to use the procatalyst for multi-step gas-phase polymerisation and this mode of polymerisation constitutes a specific aspect of the present invention.

Having thus described the catalyst composition, the polymerisation process of the present invention will now be described.

As mentioned earlier, the polymerisation process of the present invention is a multi-step, gas-phase polymerisation process, which uses two or more polymerisation reactors connected in series. Generally, the polymerisation process comprises the feeding into the first polymerisation reactor of a reaction gas mixture comprising ethylene, optionally together with other α-olefins and hydrogen, and a catalyst composition as described above; the polymerisation of the ethylene and any other α-olefin in the first polymerisation reactor; the withdrawal of the polymer powder produced from the reactor; and the transfer thereof to the second polymerisation reactor. A gas mixture comprising ethylene, optionally together with other α-olefins and hydrogen, which is different from that of the first reactor, is introduced into the second reactor, where polymerisation in the gas phase is continued, without any need for additional catalyst nor cocatalyst to be added. If the polymerisation plant comprises more than two polymerisation reactors, the various operations are continued in a similar manner in the subsequent reactors. The polymerisation conditions in each reactor should be sufficiently independent of each other to facilitate the regulation of the composition and/or the properties of the final polymer product. The gas mixtures and the polymerisation conditions are adjusted so that, in one polymerisation reactor, e.g. the first reactor, a high molecular weight polymer fraction (with low MFR) is produced, and in another polymerisation reactor, e.g. the second reactor, a lower molecular weight polymer fraction (with high MFR) is produced. The order of producing the low MFR polymer fraction and the high MFR polymer fraction is possible to change, but it is particularly preferred to produce the low MFR polymer fraction first and then the high MFR polymer fraction. Together with the present catalyst composition, this order of polymerisation inter alia has the advantage of producing little or no fines.

The polymerisation reactor used in the present process is a conventional gas-phase reactor, preferably of the fluidised-bed type. In principle, the polymerisation process may involve a number of reactors, but preferably only two reactors are used. Also, the reactors are preferably identical, i.e. of the same size as has been explained above.

The reaction gas mixture includes ethylene and, if it is desired to produce an ethylene copolymer, a minor amount, such as up to about 20 mole-%, preferably about 1–10 mole-%, of another α-olefin having 3–10 carbon atoms. In order to control the molecular weight of the polymer produced, the reaction gas mixture may also include hydrogen as a chain-transfer agent. If a low MFR polymer fraction is to be produced, the reaction gas mixture may include little or no hydrogen, while the reaction gas mixture includes a larger amount of hydrogen if a high MFR polymer fraction is to be produced. Normally, the molar ratio of hydrogen in the high MFR reactor to hydrogen in the low MFR reactor is from about 2:1 to about 200:1.

The polymerisation pressure in the reactors may vary, and generally lies in the range of from about 0.7 to 7 MPa, preferably from about 0.7 to 2.5 MPa. The partial pressure of ethylene may also vary, and normally lies in the range of from about $7 \times 10^{-2}$ to 1.4 MPa, preferably from about 0.1 to 0.7 MPa. As mentioned earlier, it is an advantage of the present invention that the ethylene partial pressure does not need to be increased in the second reactor or the subsequent reactors, but may be substantially the same in the different reactors.

The temperature in the polymerisation process may vary within a wide range from as low as about 40° C. up to about 5° C. below the melting point of the polymer produced. This means that the temperature normally lies in the range of from about 40 to about 115° C., preferably from about 50 to about 100° C. Preferably, the temperature in the low MFR polymerisation reactor is somewhat lower than the temperature in the subsequent reactor(s).

The time for carrying out the polymerisation process (or the residence time of the reactants) generally is the time needed to complete the polymerisation of the polymer fraction in question. Normally, the residence time of the reactants lies in the range of from about 0.5 to 12 hrs, preferably from about 1 to 6 hrs. As mentioned earlier, it is not necessary in the present invention to extend the residence time of the reactants in the second or subsequent reactor(s) due to the good activity balance and the high overall activity of the particular catalyst used in the present invention. Thus, the residence time is preferably similar in all the polymerisation reactors.

The invention will now be exemplified with the aid of the following Examples.

EXAMPLE 1

532,5 kg (about 760 l; 1.8 mmol/g Si) of 17.4 wt-% EADC in pentane was added slowly to 408 kg of silica (Sylopol® 55SJ, activated at 600° C. for 4 hours; pore volume about 2 ml/g) at 30–34° C. The mixture was stirred for 1,5 h at 34°.

88 kg toluene was added to a mixing tank. Then 600 kg of 20.5 wt-% BOMAG-A in n-heptane was added into the mixing tank. Finally 176 kg 2-ethyl-1-hexanol was fed during 2 hour into the reactor. The ratio between BOMAG-A and 2-ethyl-1-hexanol was 1:1.82. The magnesium content of the reaction product, the so-called "magnesium complex" was 2.01 wt-%.

Thereafter 854 kg (1.8 mmol Mg/g Si) of the above complex was added to the mixture and stirred for 4.5 h at 33° C. 70 kg (0.9 mmol/g Si) $TiCl_4$ was added to the precursor at 45° C. during 0.5 h. The catalyst was stirred at 50° C. for 5 h. Finally the catalyst was dried at 60–90° C. for 26 hours and then cooled down to room temperature.

The composition of the catalyst was 2.1% Ti, 2.2% Mg, 12.8% Cl and 2.7% Al.

A pilot plant with two continous, fluidized bed reactors connected in series was used for the polymerization. Ethylene was continuously introduced into the first polymerization reactor (PR1) at a partial pressure of 0.4–0.5 MPa. In addition also 1-butene and hydrogen were introduced into PR1 to a molar ratio between 1-butene and ethylene of 0.05 and between hydrogen and ethylene of 0.03. The reactor temperatur of PR1 was kept at about 75° C. and polymerization was carried on for about 120 h. The residence time in PR1 was 4–5 h at a bed weight of 50 kg. The low MFR polymer fraction produced in PR1 was continuously transferred to the second polymerization reactor (PR2) of the same size as PR1, where the ethylene partial pressure also was kept at 0.4–0.5 MPa. Hydrogen was also continuously fed into PR2 so that the molar ratio between hydrogen and ethylene in PR2 was 1.8. Neither 1-butene nor additional catalyst or cocatalyst were added into PR2. Polymerization was carried out in PR2 at a reactor temperature of about 100° C. The bed weight in PR2 was 75 kg and the residence time 3–4 h. The polymer product from PR2 was continuously discharged. The split between PR1 and PR2 was about 0.5:0.5.

Samples of the polymers discharged from PR1 and PR2 were subjected to analysis with regard to average particle size, bulk density, density, fines, ash, flow rate ratio and melt flow rates at different loads. In this connection the melt flow rates MFR2, MFR5, and MFR21 are determined according to ISO 1133 at a load of 2 kg, 5 kg, and 21 kg, respectively. The flow rate ratio FRR (21/5) is the ratio between MFR21 and MFR5. The results are given in Table I.

TABLE I

|  | Product discharged from | |
|---|---|---|
|  | PR 1 | PR2 |
| Average particle size (mm) | 0.98 | 1.00 |
| Bulk density (kg/m³) | 450–500 | 480–530 |
| Density (kg/m³) | 930 | 950 |
| Fines (%) | <0.5 | <1.0 |
| Ash (average, ppm) | 150 | 75 |
| FRR (21/5) |  | 22–26 |
| MFR 5 |  | 0.3–0.5 |
| MFR2 |  |  |
| MFR21 | 0.3–0.7 |  |

EXAMPLE 2

The same pilot plant reactors as in example 1 were used and also the same procatalyst/cocatalyst combination. The duration of the polymerization run was about 100 h. The polymerisation process was the same as in Example 1, but the order of polymerisation was reversed, i.e. the high MFR polymer fraction was produced in the first reactor (PR1), while the low MFR polymer fraction was produced in the second reactor (PR2).

Thus, in PR1 ethylene was introduced to a partial pressure of 0.3–0.5 MPa together with hydrogen to a molar ratio between hydrogen and ethylene of 1.5–2.0. No 1-butene was introduced into PR1. The polymerization was carried out in PR1 at a reactor temperature of about 100° C. with a bed weight of 55 kg and a residence time of 6–7 h. The polymer fraction produced was continuously transferred to PR2, to which also ethylene, to a partial pressue of 0.3–0,5 MPa, 1-butene, to a molar ratio of 1-butene to ethylene of 0.04, and hydrogen, to a molar ratio hydrogen to ethylene of 0.02, were fed. The reactor temperature in PR2 was about 75° C., the bed weight 70 kg and the residence time 3–4 h. Neither additional procatalyst nor cocatalyst were added to PR2. The split between PR1 and PR2 was about 0.5:5.

Samples of the polymers produced in PR1 and PR2 were analysed in the same way as in Example 1 and the results are given in Table II.

TABLE II

|  | Product discharged from | |
|---|---|---|
|  | PR 1 | PR2 |
| Average particle size (mm) | 0.30 | 0.45–0.50 |
| Bulk density (kg/m³) | 450 | 450 |
| Density (kg/m³) | 970 | 950–955 |
| Fines (%) | 15 | 10 |
| Ash (average, ppm) | 400 | 200 |

TABLE II-continued

| | Product discharged from | |
|---|---|---|
| | PR 1 | PR2 |
| FRR (21/5) | | 27–30 |
| MFR 5 | | 0.25–0.35 |
| MFR2 | 500 | |
| MFR21 | | |

From the above examples it is evident from the ash contents that the productivity in kilograms of polymer per gram of catalyst is about the same in the two steps irrespective of whether the polymerization is carried out in normal mode or reserved mode. However, the overall productivity is higher when the polymerization is carried out in reversed mode.

Also, the productivity was the same in the two reactors, even though the size of the reactors was the same in the two steps, the residence time in the second step was not longer than in the first step, and the ethylene partial pressure in the second step was the same as in the first step.

Further, as seen from Tables 1 and 2, the amount of fines obtained differs to a large extent, depending on if so-called "normal" or "reversed" mode operation is carried out, i.e. if the higher molecular weight fraction is produced in the second or in the first reactor, the latter mode of operation being much more advantageous. In fact the polymer produced with reversed mode operation would be suitable for film production due to low gel particle contents, while the product obtained with normal mode operation would not.

EXAMPLE 3

3.618 kg of 20 wt-% EADC (1.0 mmol/g Si) in pentane was added during 1 h to 5.7 kg of silica (Sylopol 5550; includes about 2 mmol $MgCl_2$/g Si; the $MgCl_2$ crystallites have a particle size of >2.5 nm) at 25° C. 2.3 l of pentane was added. The mixture was stirred for 1 h at 25° C.

6.202 kg (0.9 mmol/g Si) of the magnesium complex (2.01 wt-%), which preparation is described in Example 1, was added at 25° C. during 1 h. 9.1 l of pentane was added to the mixture at 25° C. The slurry was stirred for 4 h at 40° C.

0.595 kg of $TiCl_4$ (0.55 mmol/g Si) was added to the precursor during 0.5 h at 40° C. and the catalyst was stirred at 50° C. for 5 h. Finally the catalyst was dried at 60–90° C. and then cooled down to room temperature.

The composition of the dry catalyst was 2.2% Ti, 4,5% Mg, 18.4% Cl and 1.9% Al.

A pilot plant with two continuous, fluidized bed reactors connected in series was used for the polymerization. Ethylene was continuously introduced into the first polymerization reactor (PR1) at a partial pressure of 0.4–0.5 MPa. In addition also hexene and hydrogen were introduced into PR1 to a molar ratio between hexene and ethylene of 0.05 and between hydrogen and ethylene of 0.02. The reactor temperature of PR1 was kept at about 75° C. and polymerization was carried on for about 120 h. The residence time in PR1 was 4–5 h at a bed weight of 50 kg. The low MFR polymer fraction produced in PR1 was continuously transferred to the second polymerization reactor (PR2) of the same size as PR1, where the ethylene partial pressure also was kept at 0.4–0.5 MPa. Hydrogen was also continuously fed into PR2 so that the molar ratio between hydrogen and ethylene in PR2 was 1.75. Neither hexene nor additional catalyst or cocatalyst were added into PR2. Polymerization was carried out in PR2 at a reactor temperature of about 100° C. The bed weight in PR2 was 75 kg and the residence time 3–4 h. The polymer product from PR2 was continuously discharged. The split between PR1 and PR2 was about 0.53:0.47. Samples of the polymers discharged from PR1 and PR2 were subjected to analysis with regard to average particle size, bulk density, fines, ash, flow rate ratio and melt flow rates at different loads. In this connection the melt flow rates MFR2, MFR5, and MFR21 are determined according to ISO 1133 at a load of 2 kg, 5 kg, and 21 kg, respectively. The flow rate ratio FRR (21/5) is the ratio between MFR21 and MFR5. The results are given in Table I.

TABLE III

| | Product discharged from | |
|---|---|---|
| | PR 1 | PR2 |
| Average particle size (mm) | 0.95 | 0.85 |
| Bulk density (kg/m³) | 345 | 408 |
| Density (kg/m³) | 930 | 951 |
| Fines (%) | 2.5 | 1.9 |
| Ash (average, ppm) | 200 | 146 |
| FRR (21/5) | | 27 |
| MFR 5 | | 0.28 |
| MFR21 | 0.37 | 7.6 |

What is claimed is:

1. A process for the preparation of a multimodal ethylene polymer by gas-phase polymerization using a procatalyst comprising a support provided with a halogen containing compound, a magnesium compound and a titanium compound, in combination with a cocatalyst, wherein the procatalyst has been prepared by a process comprising the following steps:

a) contacting the support with a halogenating agent, said halogenating agent comprising an alkyl metal chloride, to obtain a first reaction product, b) contacting the first reaction product with a compound or mixture containing hydrocarbyl and a member selected from the group consisting of hydrocarbyloxy, monoalkylamido, dialkylamido, carboxylato, alkoxymethoxy groups, and a combination of these groups linked to magnesium, to obtain a second reaction product, wherein the amounts of the compound or mixture containing hydrocarbyl and hydrocarbyloxy, monoalkylamido, dialkylamido, carboxylato, or alkoxymethoxy groups, or a combination of these groups linked to magnesium and the alkyl metal chloride of step a) are such that the atomic ratio of the magnesium to the chlorine of the alkyl metal chloride is from 1:1.0 to 1:4.0, c) contacting the second reaction product with a titanium compound which contains chlorine and has the general formula

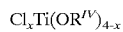

wherein $R^{IV}$ is a $C_2$–$C_{20}$ hydrocarbyl group and x is 3 or 4, to obtain said procatalyst, and wherein the gas-phase polymerization comprises at least two steps comprising a first step of contacting a gaseous composition which comprises a major part of ethylene with the procatalyst and the cocatalyst in a first reactor under polymerization conditions, to produce a polymer fraction having a first melt flow rate, and a second step of contacting the polymer fraction having a first melt flow rate and a gaseous composition which includes a major part of ethylene with the procatalyst and the cocatalyst in a second reactor under polymerization conditions, to produce a polymer fraction having a second melt flow rate.

2. A process according to claim 1, wherein in step a) the support is contacted with a halogenating agent comprising an alkyl metal chloride of the general formula $$(R_nMeCl_{3-n})_m \qquad (1)$$

wherein R is a $C_1$–$C_{20}$ alkyl group, Me is a metal of group IIIa of the Periodic Table, n=1–2 and m=1–2.

3. A process according to claim 1 wherein the step for producing the polymer fraction having the first melt flow rate precedes the step for producing the polymer fraction having the second melt flow rate.

4. A process according to claim 1, wherein the ethylene partial pressure is substantially the same in all the polymerization steps.

5. A process according to claim 1, wherein the residence time of the reaction mixture is substantially the same in all the polymerization steps.

6. A process according to claim 1, wherein the polymerization steps are carried out in gas-phase reactors of substantially the same size.

7. A process according to claim 1 wherein the gaseous monomer composition in the step for producing the polymer fraction having the first melt flow rate also includes a comonomer, which is selected from the group consisting of α-olefins having 3–12 carbon atoms.

8. A process according to claim 1 wherein the compound or mixture containing hydrocarbyl and a member selected from the group consisting of hydrocarbyloxy, monoalkylamido, dialkylamido, carboxylato, alkoxymethoxy groups, and a combination of these groups linked to magnesium of step b) has the following formula or composition $$Mg(AR')_bR''_cX_d$$

wherein A is O or NR''', where R''' is H or a $C_1$–$C_{20}$ hydrocarbyl group, R' is a $C_2$–$C_{20}$ hydrocarbyl group containing or not containing a hetero element, R'' is a $C_2$–$C_{20}$ hydrocarbyl group, X is halogen, b>0, c>0, d≧0, (b+c+d)=2 and c/b<1.

9. A process according to claim 1, wherein the support in step a) comprises an inorganic oxide which contains surface hydroxyl groups.

10. A process according to claim 9, wherein, in step a), the inorganic oxide which contains surface hydroxyl groups is contacted with an alkyl metal chloride so that the molar ratio of the alkyl metal chloride to the surface hydroxyls of the inorganic oxide is at least 1:1.

11. A process according to claim 1, wherein the support in step a) is contacted with an alkyl metal chloride, which is an alkyl aluminum chloride.

12. A process according to claim 1, wherein the titanium compound of step c) is titanium tetrachloride.

13. A process according to claim 1, wherein, when depositing the procatalyst ingredients on the support in steps a)–c), at least step a) is carried out by contacting the support with a liquid containing the ingredient, the volume of the liquid not exceeding the pore volume of the support.

14. A process according to claim 13, wherein the support is contacted several times with the liquid, that, at each contact, the volume of the liquid does not exceed the pore volume of the support, and that the liquid is removed from the support after each contact.

15. A process according to claim 13, wherein the liquid with which the support is contacted has a viscosity below 10 mPas.

16. A process according to claim 8, wherein X comprises chlorine.

17. A process according to claim 8, wherein c/b is 0.010–0.21.

18. A process according to claim 9, wherein the inorganic oxide comprises silica.

19. A process according to claim 10, wherein the molar ratio of the alkyl metal chloride to the surface hydroxyls of the inorganic oxide is between 1:1 and 10:1.

20. A process according to claim 11, wherein the alkyl aluminum chloride comprises ethyl aluminum dichioride.

21. A process according to claim 1, wherein the atomic ratio of the magnesium to the chlorine of the alkyl metal chloride is between 1:1.5 to 1:2.5.

22. A process according to claim 1 wherein the polymer fraction produced in the first step has a low melt flow rate and the polymer fraction produced in the second step has a high melt flow rate.

* * * * *